United States Patent [19]

Snyder

[11] Patent Number: 4,981,022
[45] Date of Patent: Jan. 1, 1991

[54] REFRIGERATED BICYCLE BEVERAGE CARRIER

[75] Inventor: Daniel G. Snyder, Los Angeles, Calif.

[73] Assignee: American Cycle Industries, Inc., Santa Fe Springs, Calif.

[21] Appl. No.: 404,825

[22] Filed: Sep. 8, 1989

[51] Int. Cl.$^5$ .............................................. F25D 3/08
[52] U.S. Cl. ................................... 62/457.3; 62/430; 62/457.1
[58] Field of Search ................. 62/457.2, 457.3, 457.9, 62/430, 146.6; 220/DIG. 31; 215/6

[56] References Cited

U.S. PATENT DOCUMENTS

| | | |
|---|---|---|
| 1,771,186 | 7/1930 | Mock . |
| 1,865,155 | 6/1932 | Wetmore . |
| 2,039,736 | 5/1936 | Munters et al. . |
| 2,526,165 | 10/1950 | Smith . |
| 2,734,358 | 2/1956 | Himmelfarb . |
| 2,876,634 | 3/1959 | Zimmerman et al. . |
| 3,059,452 | 10/1962 | Griffin . |
| 3,726,106 | 4/1973 | Jaefer ................................ 62/457.1 |
| 3,788,509 | 1/1974 | Keeler ...................... 220/DIG. 31 |
| 3,840,153 | 10/1974 | Devlin .............................. 62/457.9 |
| 4,441,640 | 4/1984 | Lottick . |
| 4,485,636 | 12/1984 | Hilado . |
| 4,531,383 | 7/1985 | Zimmermann . |

OTHER PUBLICATIONS

Promotional Brochure entitled "Propylene Glycol", U.S. P, FCC (1,2-Propanediol) by Union Carbide Corporation, Specialty Chemicals Division Copyrighted May 1988.

Primary Examiner—Albert J. Makay
Assistant Examiner—Joan Sollecito
Attorney, Agent, or Firm—Charles H. Thomas

[57] ABSTRACT

An improved refrigerated beverage carrier is provided to fit into a bicycle water bottle cage. The beverage carrier is comprised of a hollow, low density plastic flask having a mouth for dispensation of a beverage at one end and a central axial opening at the opposite end. A sealed, hollow, low density plastic core is inserted into the central axial opening of the flask. The core has a blind end located within the flask and an access end adapted to receive refrigerant at the central axial opening. The core is filled with a refrigerant, such as a mixture of propylene glycol and water, and is sealed to the flask by ultrasonic welding. Ultrasound is applied to an end plate having a pair of concentric annular sealing rings. The innermost annular sealing ring, when welded, forms a fluid tight seal with the core, while the outermost sealing ring, when welded, forms a fluid tight seal with the flask.

6 Claims, 2 Drawing Sheets

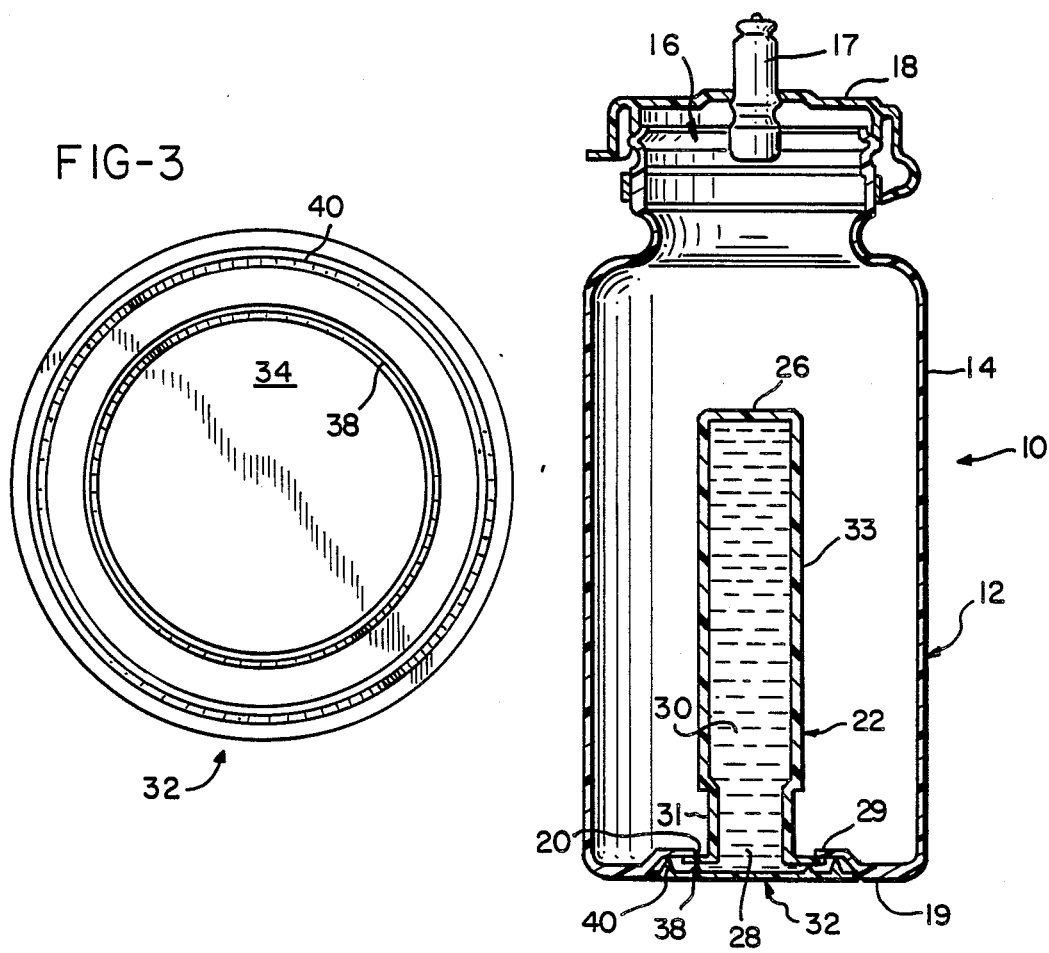
FIG-1
FIG-3
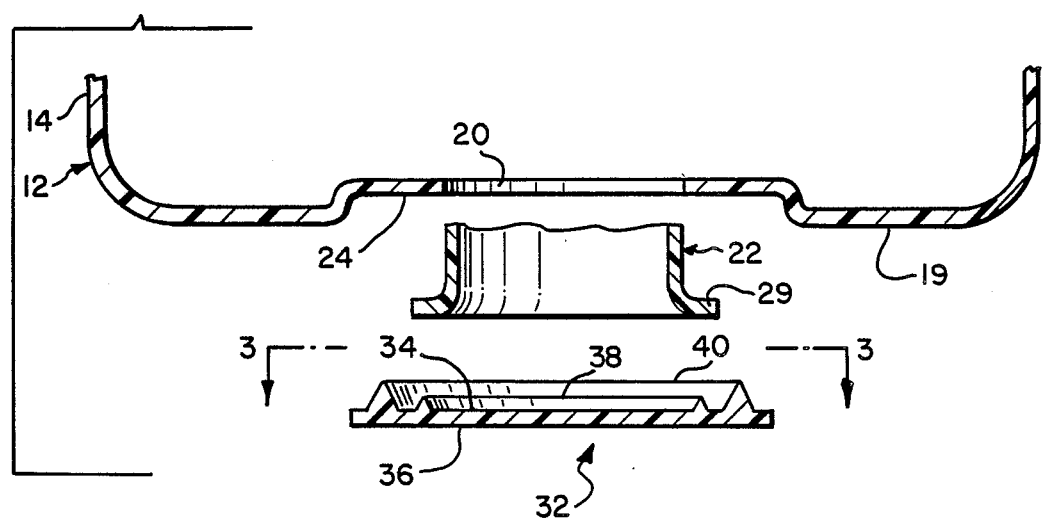
FIG-2

REFRIGERATED BICYCLE BEVERAGE CARRIER

BACKGROUND OF THE INVENTION

1. Field of the Invention

The present invention relates to an improved refrigerated beverage carrier adapted for transportation on a bicycle, and a method of manufacture thereof.

2. Description of the Prior Art

At present, bicycling enthusiasts frequently like to carry a beverage in a container with them so as to satisfy their thirst and prevent dehydration. Very typically the beverage container is merely a flask of water. While general purpose beverage containers, such as canteens and bottles, can suffice to serve as beverage carriers on a bicycle, they cannot be carried conveniently on the person of the rider. As a consequence, special purpose beverage carriers have been developed for use with bicycles.

A bicycle may be provided with a wire cage or pocket strapped or otherwise mounted on the bicycle frame to receive a beverage flask therewithin. The beverage carrier cage is typically formed by a wire framework shaped to capture and hold beverage receptacles of standardized geometric configurations and sizes. The beverage carrier cage is typically mounted by bolts or metal straps to the forward, upwardly inclined structural frame member nearest the front wheel of the bicycle. The wire and plastic cage is shaped to snugly receive a plastic beverage flask therewithin and hold it alongside and parallel to the inclined frame member. The user merely slips the flask into the beverage carrier cage while riding, and withdraws it when desired to take a sip of a beverage.

A typical bicycle beverage flask is formed in a generally cylindrical configuration with a narrowed neck and a mouth at its upper end and a flat disk-shaped bottom at its opposite end. A valve is typically mounted in the mouth of the bicycle beverage carrier flask so as to minimize the likelihood of spilling of the beverage while riding a bicycle. The sides of the beverage carrier flask are soft so that they can be squeezed to force a liquid beverage out through the valve and into the mouth of the rider.

One problem which has persisted in the use of conventional bicycle beverage carriers is that the contents of the carrier frequently becomes excessively warm. When riding a bicycle during warm weather under the conditions during which thirst quenching and fluid replacement is most desired, the beverage in a conventional carrier, like the rider, will become overheated. As a consequence, the contents of the beverage carrier become warm. The beverage thereafter does not serve its principal purpose of refreshing the bicyclist, and indeed the imbibition of a warm beverage by a bicyclist seeking such refreshment can create a certain degree of nausea.

To attempt to remedy this problem the bicyclist will frequently attempt to cool the contents of the carrier prior to undertaking a bicycle journey. The simplest way of cooling a bicycle beverage carrier is by placing ice cubes in the carrier. However, on a warm day the cooling effect of ice cubes lasts only a relatively short period. After a half an hour or so the contents of the beverage carrier are just as warm as if ice had never been introduced into it.

To attempt to create a more lasting effect artificial refrigerants have been employed. Such conventional refrigerants may take the form of cubic or spherical capsules of plastic filled with a material which absorbs a greater quantity of heat when changing from a solid to a liquid state than does plain water. One such substance is a mixture of 10% propylene glycol and 90% water. Such a substance is classified as a food grade refrigerant, is non-toxic, and is approved by the U.S. Food and Drug Administration.

In conventional practice cubes or other capsules of the artificial refrigerant are frozen in a freezer prior to undertaking a bicycle journey. The small capsules of artificial refrigerant are then placed in the bicycle beverage carrier and the remaining volume of the carrier is filled with a beverage, such as water. While the refrigerant filled capsules do provide a greater cooling effect to the beverage in the container than plain ice cubes, the capsules float at the surface of the beverage, and thereby absorb some heat from the ambient air within the beverage carrier, as well as from the fluid to be cooled. As a consequence, a substantial portion of the cooling effect of the refrigerant capsules is dissipated due to thermal cooling of air within the beverage carrier, as well as cooling of the liquid beverage.

SUMMARY OF THE INVENTION

An object of the present invention is to provide an improved beverage carrier adapted to fit into a bicycle water bottle cage whereby a high degree of surface area of contact exists between a refrigerated core and the surrounding beverage. A further object of the invention is to provide a bicycle beverage carrier which is extremely light in weight.

In one broad aspect the present invention may be considered to be an improved beverage carrier adapted to fit into a conventional bicycle water bottle cage comprising a hollow, low density plastic flask having a mouth at one end and a central axial opening at an opposite end, and a sealed, hollow, low density plastic core filled with a refrigerant and located within the flask and sealed fluid tight relative thereto at the central axial opening at the opposite end of the flask.

In its preferred form the invention is comprised of a low density plastic cap or plate that is sealed both across the core and to the end of the flask opposite the mouth. The cap or plate is of a disk-shaped configuration and is provided on one of two opposing circular surfaces with a pair of coaxial, annular sealing rings. The innermost of the sealing rings is sealed across the core throughout and the outermost of these rings is sealed throughout to the end of the flask opposite the mouth. The radially inner seal thereby prevents the refrigerant from escaping from the central hollow core and mixing with the beverage in the flask. The radially outer seal prevents any leakage of the beverage from the flask.

Preferably, the low density plastic employed is polyethylene and the refrigerant is a mixture of propylene, glycol and water. Typically the refrigerant mixture will be comprised of 10% propylene glycol and 90% water.

A further object of the invention is to provide an improved beverage carrier which will maintain a beverage in a chilled condition and which will fit within a conventional bicycle water bottle cage. The improved beverage carrier of the invention does not involve projecting fittings, couplings, or other protuberances. Its external configuration is the same as one of the standardized conventional exterior shapes for such carriers.

The improved beverage carrier thereby fits within a conventional bicycle water bottle cage.

Another object of the invention is to provide a refrigerated beverage carrier which is squeezable and durable and which does not impart any taste to the beverage to be imbibed. Accordingly, both the surrounding flask and the encapsulated hollow core are formed of low density polyethylene. This plastic material provides a high degree of insulation to prevent beverages within the container from absorbing heat from the surrounding atmosphere too rapidly. Thus, the beverage carrier of the invention retards the rise of temperature of the beverage even during long bicycle journeys.

On significant problem which is encountered with constructing composite structures of polyethylene is that low density polyethylene is hard to work with. This low density plastic does not readily combine with other types of plastic. Also, it is very inert and cannot be effectively sealed using an adhesive.

One extremely difficult problem which has been solved in accordance with the present invention is the problem which has existed in providing leak proof seals to prevent the refrigerant from mixing with the beverage and to prevent the beverage from leaking from the flask without unnecessarily complicated and inordinately heavy sealing mechanisms. While the requisite seals could be provided by threaded cap constructions or by gaskets, such methods of construction would involve additional weight as well as an increase in the cost of fabrication. Accordingly, the present invention provides an improved method of manufacture, as well as the beverage carrier produced according to that method.

In another broad aspect the present invention may be considered to be a method of forming a beverage carrier for use on a bicycle comprising: molding a flask of low density plastic with a mouth at one end and a central axial opening at its opposite end, molding a hollow core of low density plastic, inserting the core into the flask through the central axial opening in the end thereof opposite the mouth, filling the core with refrigerant, and sealing the core shut and sealing the core to the opposite end of the flask.

The step of sealing is preferably performed by welding an end plate or cap across the core and to the opposite end of the flask using ultrasonic energy. The disk-shaped end plate is provided with a pair of concentric annular sealing rings on one of two flat circular surfaces. The innermost of the sealing rings is welded to the core throughout using ultrasound so as to seal the core shut. The outermost of the sealing rings is welded throughout by ultrasound to seal the core to the end of the flask opposite the mouth of the beverage carrier. An ultrasonic welding system of the type described in U.S. Pat. No. 3,489,930 may be employed for this purpose.

The invention may be described with greater clarity and particularity with reference to the accompanying drawings.

DESCRIPTION OF THE DRAWINGS

FIG. 1 is a sectional elevational view of an improved beverage carrier according to the invention.

FIG. 2 is an enlarged exploded view of a portion of the beverage carrier of FIG. 1.

FIG. 3 is a plan view taken along the lines 3—3 of FIG. 2.

DESCRIPTION OF THE EMBODIMENTS AND IMPLEMENTATION OF THE METHOD

Figure 4:
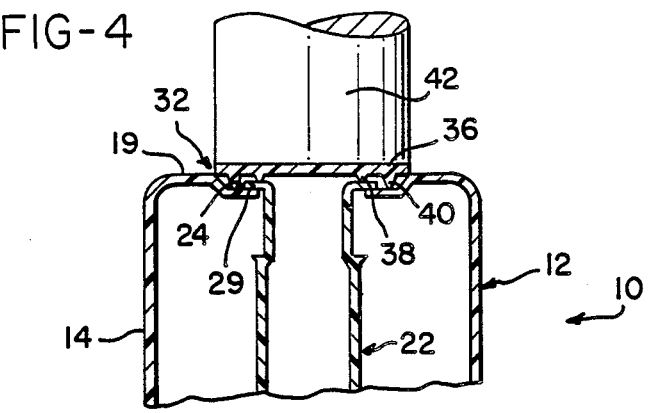
FIG. 4 is a sectional elevational view illustrating the method of manufacture of the invention.

FIG. 1 illustrates a beverage carrier indicated generally at 10 adapted to fit into a conventional bicycle water bottle cage. The beverage carrier 10 is comprised of an outer flask 12 formed of low density polyethylene plastic. The flask 12 has a cylindrical body 14 which narrows at its upper end 18 to form a mouth indicated generally at 16. The mouth 16 is provided for dispensing water from the flask 12 through a valve 17. At the end 19 of the body 14 opposite the mouth 16 there is a circular axial opening 20, best illustrated in the exploded view of FIG. 2.

The height of the beverage carrier 10 is 7.094 inches and the outer diameter of the cylindrical body 14 is 2.89 inches. The wall thickness of the flask 12 is 0.05 inches. As illustrated in FIG. 2, the end 19 of the flask 12 remote from the mouth 16 is formed with a central axial depression 24. The diameter of the depression 24 is 1.51 inches. The depth of the depression 24 from the plane of annular remainder of the flask end 19 is 0.095 inches.

The beverage carrier 10 is also comprised of a hollow generally cylindrical core 22, also formed of low density polyethylene plastic and having a circular cross section. The core 22 extends into the cylindrical body 14 as illustrated in FIG. 1, through the central axial opening 20. The core 22 is sealed to the end 19 of the body 14 in fluid tight fashion about the central axial opening 20.

As illustrated in FIG. 1, the core 22 is formed with a blind end 26 disposed within the flask body 14 and an opposite access end indicated generally at 28. A radially outwardly projecting lip 29 is defined on the core 22 at the access end 28. The access end 28 is adapted to be filled with refrigerant, and FIG. 1 illustrates a liquid refrigerant mixture 30 disposed within the hollow core 22. A disk-shaped end plate 32, also formed of low density polyethylene plastic, is sealed across the access end 28 of the core 22 and to the end 19 of the body 14 opposite the mouth 16.

The overall height of the core 22 is 4.5 inches. The outwardly turned lip 29 at the access end 28 of the core 22 has an outer diameter of 1.25 inches. The lip 29 protrudes radially outwardly from the reduced diameter section 31 of the core 22 a distance of 0.063 inches. The cylindrical tubular portion of the core 22 above the reduced diameter section 31 is indicated at 33. The outer diameter of the core tube 33 is 1.095 inches. The wall thickness of the core 22 is 0.03 inches and the interior diameter of the cavity containing the refrigerant 20 is 0.66 inches.

The refrigerant 30 may be comprised of a 10% mixture of propylene glycol with 90% water. A suitable form of propylene glycol for use as the refrigerant 30 is sold by Union Carbide Corporation, Specialty Chemical Division, 39 Old Ridgebury Road, Danbury, Conn. 06817-0001 under the trade designation Propylene Glycol, U.S. Pat. FCC (1,2-propanediol).

As illustrated in FIGS. 2 and 3, the polyethylene end plate 32 is formed in the shape of a disk and has a circular inwardly facing surface 34 and an opposite circular outwardly facing surface 36. The end plate 32 is formed with a pair of concentric annular sealing rings 38 and 40 projecting from the inwardly facing surface 34.

As illustrated in FIG. 1, the innermost sealing ring 38 projects above the plane of the inwardly facing surface 34 a very short distance and is welded throughout to the lip 29 of the core 22. The outermost sealing ring 40 projects a greater distance above the plane of the inwardly facing surface 34 of the end plate 32. The height of the sealing ring 40 above the surface 34 is greater than the height of the sealing ring 38 by a distance equal to the thickness of the lip 29. The sealing ring 40 is welded throughout to the surface of the depression 24 in the end 19 of the body 14 opposite the mouth 16.

In manufacturing the beverage carrier 10 the flask 12 is molded of low density polyethylene having a mouth 16 at one end and the central axial opening 20 at its opposite end. Similarly, the hollow core 22 is molded of low density polyethylene. The core 22 is then inserted into the flask 12 through the central axial opening 20 in the end 19 thereof opposite the mouth 16. The cavity 30 within the core 22 is then filled with refrigerant 30.

As illustrated in FIG. 4, the core 22 is sealed shut and is sealed to the end 19 of the flask 12 by means of ultrasonic welding. One ultrasonic welding device which may be employed is the Branson Model 460A ultrasonic welder, manufactured by Branson Instruments, Incorporated of Stamford, Conn.

As depicted in FIG. 4, the ultrasonic transducing horn 42 of an ultrasonic welder is pressed against the center of the outwardly facing surface 36 of the end plate 32 such that the interior annular sealing ring 38 of the end plate 32 resides in contact with the lip 29 of the core 22 and the outer annular sealing ring 40 of the end plate 32 resides in contact with the depression 24 in the end wall 19 of the flask 12. The ultrasonic welder is then actuated for no more than two seconds at a power of at least about 400 watts up to a maximum power of about 1200 watts.

Actuation of the ultrasonic welder causes the end plate 36 to vibrate at an ultrasonic frequency, thereby creating considerable friction between the annular sealing rings 38 and 40 and the lip 29 and depression 24 of the end 19. This high frequency ultrasonic vibration and the resultant friction produces localized melting of the polyethylene plastic and welds the end plate 32 across the core 22 and to the end 19 of the flask 12 that is opposite the mouth 16 thereof.

The innermost sealing ring 38 is welded or melted throughout its entire circumference to the lip 29 of the core 22. The end plate 32 thereby seals the core 22 shut so that there will be no leakage of the refrigerant through the interface between the annular seal 38 and the lip 29. Similarly, the outermost annular seal 40 is likewise melted to form a weld throughout its entire circumference to seal the end plate 32 to the end 19 of the flask 12. This seal is likewise fluid tight so that there can be no leakage of the beverage through the circular opening 20 past the interface between the outer sealing ring 40 and the end wall 19.

With the core 22 sealed within the flask 12 and filled with refrigerant, the beverage carrier 10 may be used by a bicyclist to keep a beverage located within the flask 12 cool for a prolonged period of time. Prior to undertaking a journey, the beverage carrier 10, devoid of any beverage, is placed in a freezer for several hours to freeze the refrigerant within the core 22. The beverage carrier 10 is then removed from the freezer and the flask 12 is filled with a beverage, such as common drinking water. The water fills the annular portion of the body 14 surrounding the core 22 and the region above the core 22 as well. The refrigerant 30 draws heat from the surrounding beverage by radial thermal conduction through the polyethylene wall of the core 22. The beverage carrier 10 will maintain the beverage contained therein in a chilled condition for a prolonged period of time.

Figure 5:
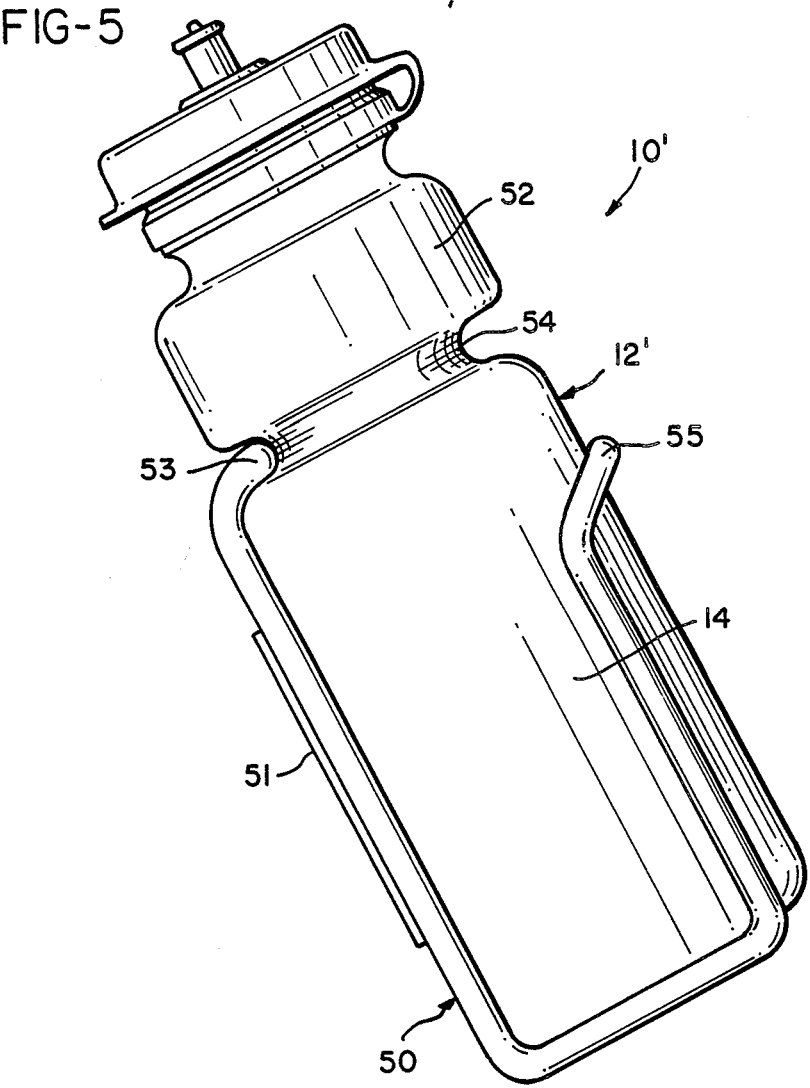
FIG. 5 is an elevational view showing an alternative embodiment of the improved beverage carrier of the invention constrained within a bicycle water bottle cage.

FIG. 5 illustrates an alternative embodiment of the invention. A beverage carrier 10' is depicted within the confines of a conventional wire bicycle water bottle cage 50. The cage 50 includes a mounting bracket 51 that is normally secured to the forward, upwardly inclined structural frame member of a bicycle located nearest the front wheel. The cage 50 has a plastic covered wire loop 53 that seats in a groove 54 in the carrier 10. Another wire loop 55 captures the cylindrical body of the flask 12 and holds it against the bracket 51.

The beverage carrier 10' differs in construction from the beverage carrier 10 only in that it is provided with an auxiliary storage region 52 located above the body 14 of the flask 12'. The outer configuration of the beverage carrier 10 is virtually identical to that of one size of conventional beverage carrier that is widely used and carried by bicyclists for transporting drinking water during bicycle journeys. The beverage carrier 10 by itself weighs only two ounces when the core 22 is filled with refrigerant 30. When the flask 12 is filled with water the beverage carrier 10 weighs only twenty two ounces. The beverage carrier 10' depicted in FIG. 5 likewise has an outer configuration virtually identical to another widely used beverage carrier especially adapted for use in carrying a beverage during a bicycle journey. The beverage carrier 10' likewise weighs only two ounces when the flask 12' is empty and weighs twenty eight ounces when the flask 12' is filled.

Undoubtedly, numerous variations and modifications of the invention will become readily apparent to those familiar with bicycle accessories. Accordingly, the scope of the invention should not be construed as limited to the specific embodiments of the beverage carriers illustrated, nor to the specific implementation of fabrication described herein, but rather is defined in the claims appended hereto.

I claim:

1. An improved beverage carrier adapted to fit into a bicycle bottle cage comprising a hollow, low density plastic flask having a mouth at one end and a central axial opening at an opposite end, a hollow, low density plastic core filled with a refrigerant and located within said flask, and a low density plastic cap having a surface facing said core and said opposite end of said flask and provided with a pair of coaxial annular sealing rings projecting from said surface, wherein the innermost of said rings is welded throughout its entire circumference to said core and sealed fluid tight relative thereto and the outermost of said rings is welded throughout its entire circumference to said flask opposite and along a circumference inwardly spaced from and coaxial with said cylinder body and sealed fluid tight relative thereto solely by said welds.

2. An improved beverage carrier according to claim 1 wherein said low density plastic is polyethylene.

3. An improved beverage carrier according to claim 1 wherein said refrigerant is a mixture of propylene glycol and water.

4. A beverage carrier adapted to fit into a bicycle water bottle cage comprising an outer flask formed of low density plastic and having a cylindrical body forming a mouth at one end and dispensing water therefrom and a central, circular, axial opening at an end of said body opposite said mouth, a hollow core also formed of low density plastic and formed with a blind end disposed within said body and an opposite access end adapted to be filled with refrigerant and extending into said cylindrical body through said central axial opening, and an end plate formed of low density plastic and having a surface facing both said hollow core and said end of said body of said flask opposite said mouth, wherein said end plate is formed with a pair of concentric, annular sealing rings projecting from said surface, the innermost of which is welded throughout its circumference to said core to encircle said access end thereof and the outermost of which is welded through its circumference to said end of said body of said flask along a circumference inwardly spaced from and coaxial with said cylindrical body opposite said mouth, whereby said cap is sealed fluid tight to said outer flask by said outermost sealing ring and to said core by said innermost sealing ring solely by said welds.

5. A beverage carrier according to claim 4 wherein said low density plastic is polyethylene.

6. A beverage carrier according to claim 5 wherein said refrigerant is comprised of a mixture of propylene glycol and water.

* * * * *